United States Patent [19]

Kinney et al.

[11] Patent Number: 5,500,872
[45] Date of Patent: Mar. 19, 1996

[54] SPREAD SPECTRUM BASE BAND PROCESSOR

[75] Inventors: Patick W. Kinney; Ronald L. Mahany; Steven E. Koenck, all of Cedar Rapids, Iowa

[73] Assignee: Norand Corporation, Cedar Rapids, Iowa

[21] Appl. No.: 308,810

[22] Filed: Sep. 19, 1994

Related U.S. Application Data

[63] Continuation-in-part of Ser. No. 229,532, Apr. 19, 1994, which is a continuation-in-part of Ser. No. 129,876, Sep. 30, 1993, abandoned, which is a continuation of Ser. No. 974,731, Nov. 13, 1992, abandoned.

[51] Int. Cl.⁶ .................................................. H04L 27/30
[52] U.S. Cl. ........................................ 375/208; 380/34
[58] Field of Search .................................. 375/200, 208, 375/209, 210; 380/34

[56] References Cited

U.S. PATENT DOCUMENTS

| | | | |
|---|---|---|---|
| 4,484,335 | 11/1984 | Mosley et al. ........................ | 375/208 |
| 4,528,674 | 7/1985 | Sweeney et al. ..................... | 375/208 |
| 4,530,103 | 7/1985 | Mosley, Jr. et al. .................. | 375/208 |
| 4,761,795 | 8/1988 | Beier .................................... | 375/200 |
| 4,943,975 | 7/1990 | Kurihara et al. ...................... | 375/208 |
| 5,031,192 | 7/1991 | Clark ..................................... | 375/200 |
| 5,395,515 | 3/1995 | Dixon et al. .......................... | 375/208 |

*Primary Examiner*—Stephen Chin
*Assistant Examiner*—T. Ghebretinsae
*Attorney, Agent, or Firm*—McAndrews, Held & Malloy, Ltd.

[57] ABSTRACT

An apparatus including an antenna and amplifier for receiving and amplifying a spread spectrum signal, at least two correlators for determining the correlation levels of the received signal with respect to the correlators corresponding code sequences, and a comparator for comparing the output levels of the two correlators. A signal detector is operably connect to the correlators for determining when a code sequence has been detected on one of the correlators. A phase-locked loop is controlled by the output of the signal detected unit and triggers a sample and hold device which samples the output of the comparator. A device is also provide to output the decoded data which is held on the sample and hold device.

3 Claims, 5 Drawing Sheets

SPREAD SPECTRUM BASE BAND PROCESSOR

AUTHORIZATION PURSUANT TO 37 CFR 1.71 (d) (e)

A portion of the disclosure of this patent document contains material which is subject to copyright protection. The copyright owner has no objection to the facsimile reproduction by anyone of the patent disclosure or the patent disclosure, as it appears in the Patent and Trademark Office patent file or records, but otherwise reserves all copyright rights whatsoever.

CROSS REFERENCE TO RELATED APPLICATIONS (Claiming Benefit Under 35 U.S.C. 120)

This application is a continuation-in-part of application Ser. No. 08/229,532 filed Apr. 19, 1994 by S. Koenck, et al (Attorney Docket No. DN 37972B) which is in turn a continuation-in-part of application Ser. No. 08/129,876 filed Sept. 30, 1993 now ABN by S. Koenck et at. (Attorney Docket No. DN 37972A) which is in turn a continuation of application Ser. No. 07/974,731 filed Nov. 13, 1992 now ABN by S. Koenck et al. (Attorney Docket No. DN 37972).

TECHNICAL FIELD

The present invention relates generally to spread spectrum communication used for transmitting and receiving information and more particularly to an improved method and apparatus for receiving and decoding information which has been sent in the spread spectrum band.

BACKGROUND ART

Spread spectrum communication is a method of transmitting information in which the bandwidth of the signal is deliberately increased, or spread out, over a much wider range than would normally be occupied with conventional modulation transmission. In direct sequence systems, the carder signal is modulated by code sequences. The code sequences are sequences of binary units, called chips, and have a fixed length, called the chip length.

A particular code sequence is assigned to each bit of information that is to be transmitted. The code signals are typically quite long relative to the bit of information to be transmitted. For example, if the information to be sent is in binary or digital form, a particular code sequence will be assigned to a "0" and a different code sequence will be assigned to a "1". Each code sequence might be 63, 127 or 255 chips long. System using more than two information symbols would require additional code sequences.

As the modulated signal is received, the signal is correlated. That is, the receiving unit is looking for the particular codes used to modulate the carder signal. The receiving unit simultaneously and continuously looks for all of the possible codes that could be carded on the carder signal. This task is accomplished by the receiving unit through the use of a series of correlators. Each possible code has its own correlator. Each correlator is looking chip by chip at the sequences as they are received. The output of the correlator is an a signal whose magnitude is determined by how much correlation there is between the sequence received and the sequence it is looking for. If the chip length is n, then the correlator is always looking at the most recent sequence of n chips that have been received.

The choice of the codes used in spread spectrum communication is very important. Two important considerations in determining what represents a good code are its autocorrelation and its cross-correlation characteristics. Autocorrelation refers to the amount of correlation the code has with itself that exists while the code is being transferred into the correlator. Thus, assume that the signal being received by the correlator is the same sequence, of chip length n, repeated over and over. Autocorrelation refers to the amount of correlation that exists when the most recent n chips consists partially of the end of the previous sequence and partially of the beginning of the new sequence. Codes must be designed to minimize the amount of correlation that occurs during transition between the first sequence and the second sequence and thereby minimize the chance of false correlation.

Cross-correlation refers to the amount of correlation that exists between the different codes in a particular system. For example, in a binary system where a first sequence represents a "0" and a second sequence represents a "1", cross-correlation refers to the amount of correlation that will be detected by one of the correlators when the sequence received is for the other sequence. As a practical matter, cross-correlation cannot be completely eliminated and thus when one sequence is received, and thus a larger correlation signal is outputted by the correlator looking for that sequence, smaller correlation signals are also outputted by the other correlators in the system.

Decoding is accomplished by observing the output of the correlators. In an ideal system, as soon as the entire sequence for a given piece of data has been completely transferred into the correlator a perfect match, that is, complete correlation, would be accomplished. However, in a practical setting, there is a considerable amount of noise which can cause interference in the signal. Thus a match is usually detected by determining a certain threshold that must be met. For the decoder to actually determine that a certain piece of data was indeed sent, some threshold amount of correlation must take place. Thus it can be seen why it is necessary to keep the amount of autocorrelation at a minimum.

In some systems, multiple threshold detections are used. This is an attempt to compensate for the cross-correlation factor. Without multiple thresholds, in a particularly noisy environment, it would be possible for the decoder to determine that none of the sequences had matched or, conversely, that multiple sequences had matched. The use of more than one threshold helps to alleviate this problem. If there are two correlation thresholds, a high and a low, then the first situation described might be avoided if one signal only breaks the lower threshold while the other breaks neither. The decoder could assume that while only a low threshold was detected, since the other was too low to break either thresholds, then the signal which broke low threshold was the signal sent. The problem of multiple sequence detection might be solved if the real signal breaks the high correlation threshold while the other signal only breaks the low. In this case the decoder can assume that it was the signal that broke the high threshold that was sent.

While the multiple threshold decoder systems help to alleviate some of the false or incorrect sequence detect problems, they do not eliminate them completely. For example, in a noisy environment, when no real signal should actually be detected, the interference from the noise might cause one of the low thresholds to be triggered while the other is not. The decode system then must try to determine whether or not the signal is real in addition to determining which of the signals has been detected. Furthermore, determining the proper level of the thresholds is extremely difficult. The thresholds must be set low enough to detect noise deteriorated signals but not so low as to give false indications. Additionally, the thresholds must be set high enough to assure that a real match has occurred, but not too high for fear of missing a signal sent. Furthermore, the different thresholds must be different enough so as to actually have them signify different degrees of correlation. These differences must be determined with the above considerations in mind.

It should be obvious that setting the thresholds is a difficult task to begin with. It is, however, further complicated by the fact that the environment in which the system must work is constantly changing. Thus, a particular system which may work in one location one time, might not work in the same location the next time without an adjustment of the thresholds. Furthermore, the problem is increased when the spread spectrum system is moved to another location which is constitutes a different environment completely.

Thus, there is a need for a decoding system for spread spectrum communications which does not rely on the use of one or more thresholds for determining the signal which has transmitted.

DISCLOSURE OF THE INVENTION

The present invention relates generally to spread spectrum systems for transmitting and receiving information and more specifically to an improvement in the method in which the transmitted signal is decoded. The received signal passes through at least two correlators which correspond to the different sequence possibilities which are being transmitted. The output of the correlators are then compared to determine which sequence has the strongest correlation. The decode thus determines the signal which was most likely transmitted.

The decoding is further improved by the use of a signal detection circuit which makes it possible for the comparison to occur at the time the information is most likely to be correct. Thus, even if the signals have been greatly deteriorated by environmental noise, an accurate decision is likely to result.

An object of the present invention is to provide an improved decoding receiver for spread spectrum communication.

Another object of the present invention is to provide an improved method of decoding information transmitted in a spread spectrum communication system.

A further object of the present invention is to provide a way of comparing the degrees of correlation for each code sequence used in transmitting information to accurately determine the information transmitted.

Another object of the present invention is to provide a signal detection circuit which allows the comparison of the correlation levels for each code sequence to occur at a time when the levels are most likely to be correct.

Still another object of the present invention is to provide a way of determining and remembering the appropriate time to compare the correlation levels even when a transition detection does not occur.

Other objects, advantages, and novel features of the present invention will become apparent from the following detailed description of the invention when considered in conjunction with the accompanying drawings.

BEST MODES FOR CARRYING OUT THE INVENTION

Figure 1:
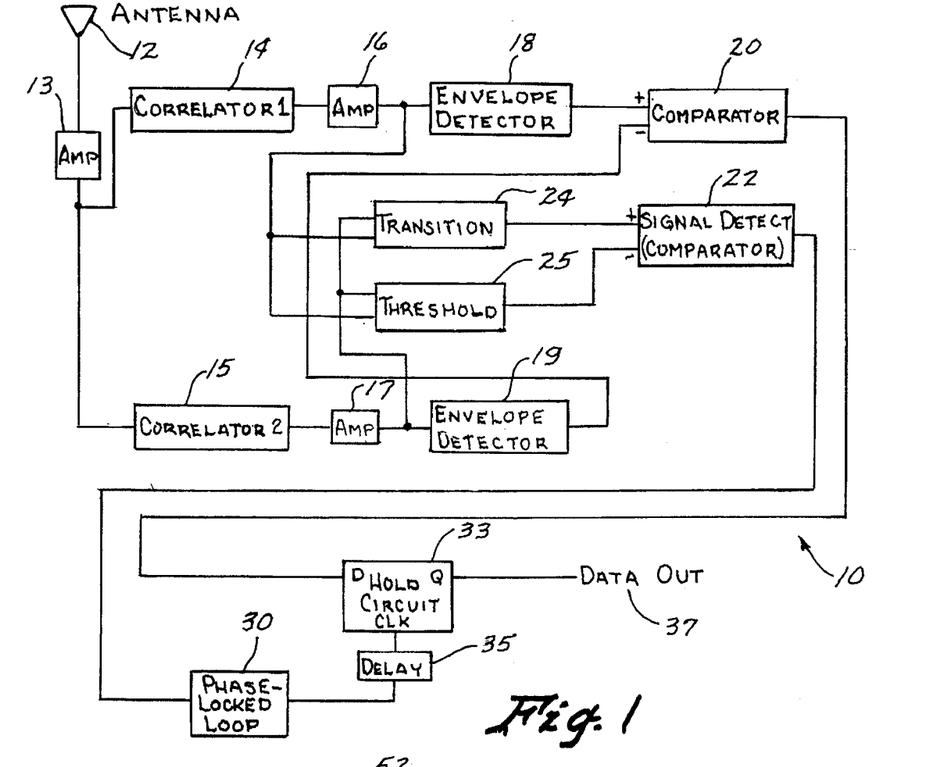
FIG. 1 is a block diagram of a receiver for decoding spread spectrum information built in accordance with the present invention.

Referring now to the drawings wherein like reference numerals designate identical or corresponding parts throughout the several views, FIG. 1 shows a spread spectrum band processor (10) built in accordance with the present invention for decoding received spread spectrum transmissions. A spread spectrum transmission is received by an antenna (12), amplified by an amplifier (13), and sent to a first correlator (14) and a second correlator (15). The correlators (14 & 15) are used to identify code sequences which have been used to modify the carrier signal. For example, in this two correlator system, the two correlators (14 & 15) might be used to detect either a code sequence representing a "1" or a code sequence representing a "0".

A correlator determines the level of correlation between the signal which is being received and the particular code sequence it is looking for. The code sequence is a binary sequence of chips. The number of chips determines the code sequence length. The correlator continually compares the received transmission to the code sequence it is looking for on a chip by chip basis. For each chip for which there is a match, the correlator assigns a +1 value. Conversely, for each chip for which there is not a match, the correlator assigns a −1 value. The correlator then sums the total for all of the chips and this number determines the correlator output.

Figure 3:
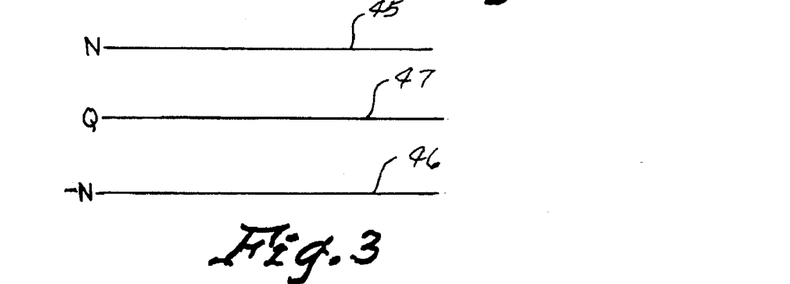
FIG. 3 is a diagrammatic illustration of the different levels of correlator output.

Referring to FIG. 3, the parameters for the output of the correlator are shown. For a correlator which is looking for a code sequence with a chip length N, the correlator would be at its maximum output, N (45), when all chips match. If none of the chips match, then the correlator output would be at its lowest level, −N (46). An output at or around zero (47) represents approximately the same number of matches as non-matches. This is the expected result of random noise or interference which is not meant to be interpreted by the processor. The codes are specifically designed to have a low autocorrelation such that the correlation will remain around zero until the entire sequence is transferred into the correlator.

Figure 2:
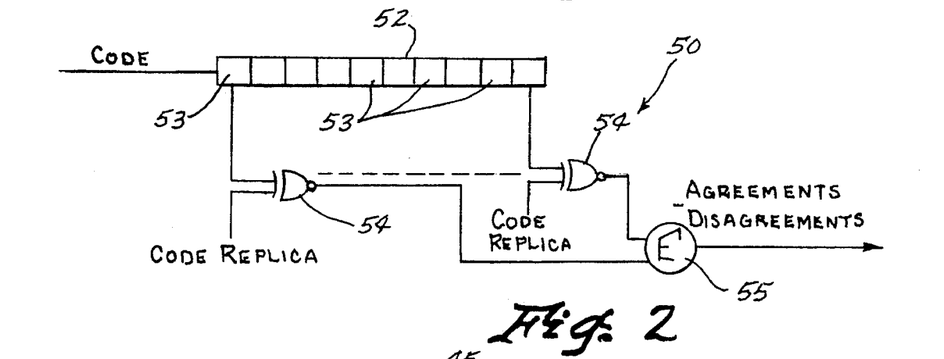
FIG. 2 is a schematic diagram of a shift register correlator.

Referring to FIG. 2, a shift register correlator (50) is shown. The received signal is put through an analog-to-digital converter (not shown). The digital signal is then shifted through the shift register (52) which must be at least as long as the chip length of the sequence code. Each bit (53) of the shift register (52) represents one chip of the code sequence. The outputs of each bit (53) are compared with a corresponding signal representing the code sequence for which the correlator (50) is looking using EXCLUSIVE-NOR gates (54). The outputs of the EXCLUSIVE-NOR gates (54) are connected to a summing device (55) which, as discussed above assigns a +1 for a match and a −1 for a non-match. Thus, the output of the summing device (55) is at its maximum when there is a complete match, at its minimum when there are no matches, and at or about the middle when there is approximately the same number of matches as non-matches.

Figure 6:
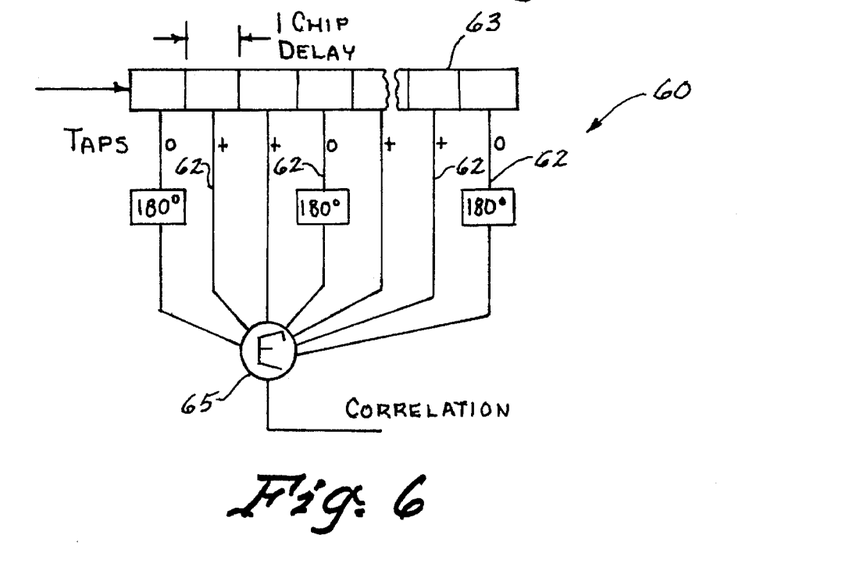
FIG. 6 is a schematic diagram of a SAW correlator.

Referring now to FIG. 6, a surface acoustic wave (SAW) correlator (60) is shown. A SAW correlator (60) can be directly connected to the source signal and is used to detect the phase shift modulations in the carrier signal. In this kind of system, the phase of the carrier signal is modulated by the code sequences during transmission. A SAW correlator (60) is configured to look for a particular sequence of phase shifts. The SAW correlator (60) is configured in a particular way by the positioning of taps (62) on an analog delay line (63). The transmitted signal travels along the analog delay line (63). The taps (62) are spaced along the analog delay line (63) at intervals which correspond to the time it takes each chip of information to travel along the analog delay line (63). Each tap (62) corresponds to one chip of the code sequence. The taps (62) look for the signal to either be in-phase or 180 degrees out of phase. If the phase of the signal matches the phase looked for by a particular tap (62), then there is a match for that particular chip. If the phase of the signal does not match the phase looked for by a particular tap (62), then there is no match for that particular chip. The outputs of the taps (62) are connected to a summing device (65). Similar to the discussion above, the output of the summing device is at a maximum when all of the chips match, a minimum when none of the chips match, and at or about the middle when there are approximately the same number of matches as non-matches.

Figure 4:
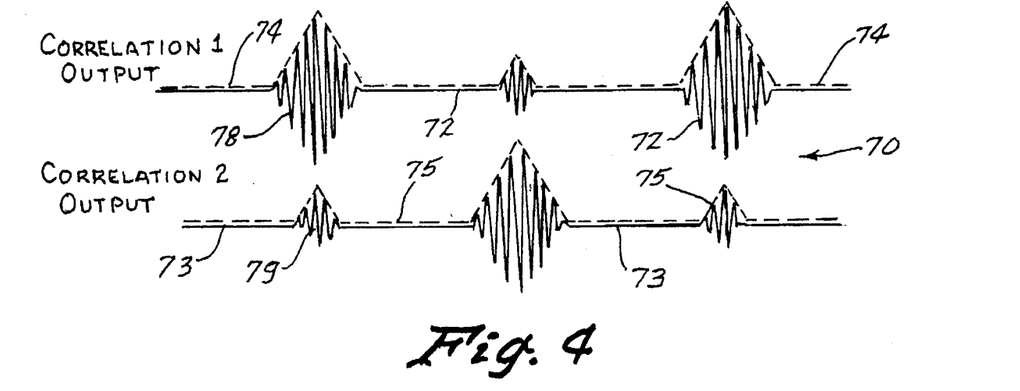
FIG. 4 is a diagrammatic illustration of sample outputs in a noiseless environment of the correlators of FIG. 1.

Referring back to FIG. 1, the outputs of the correlators (14 & 15) are connected to amplifiers (16 & 17) which are in turn connected to envelope detectors (18 & 19). The envelope detectors (18 & 19) operate as peak detectors with a relatively short time delay constant. The resulting output corresponds to a signal which effectively connects successive signal peaks. Referring to FIG. 4, sample wave forms (70) for the two correlators (14 & 15) are shown in solid black lines (72 & 73). The output of the corresponding envelope detectors (18 & 19) are shown in dashed lines (74 & 75).

The large peak (78) along line (72) corresponds to a strong correlation between the sequence code searched for by the first correlator (14) and the received signal. The small peak (79) along line (73) corresponds to the cross-correlation characteristic of code sequences in general. Typically, a code sequence which is intended to match one correlator will also match the other correlator to a smaller degree. This is known as cross-correlation.

Figure 5:
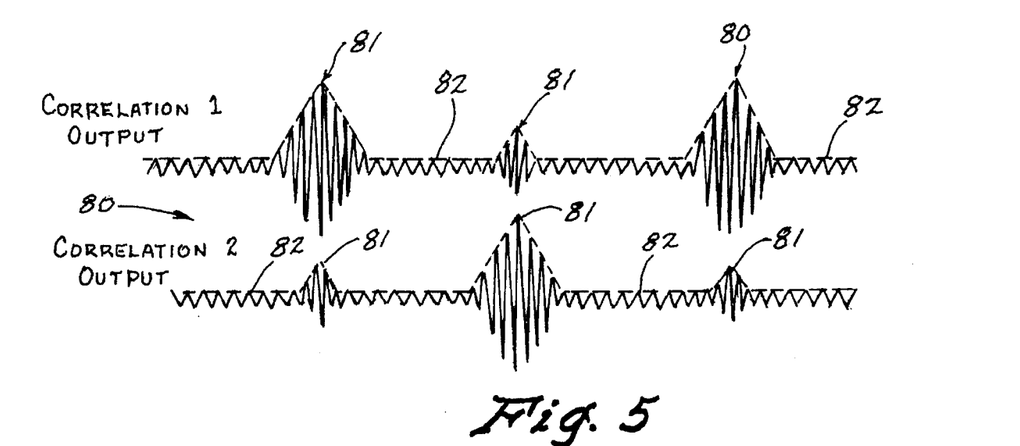
FIG. 5 is a diagrammatic illustration of sample outputs in a noisy environment of the correlators of FIG. 1.

FIG. 4 shows sample wave forms in an ideal or noiseless environment. As can be seen in the wave forms (80) of FIG. 5, noise and other interference in the environment can deteriorate the quality of the signal from the correlators (14 & 15). Further, it should be noted that noise and interference has the effect of reducing the amplitude of the peaks (81) produced by the envelope detector relative to its baseline (82).

Figure 9:
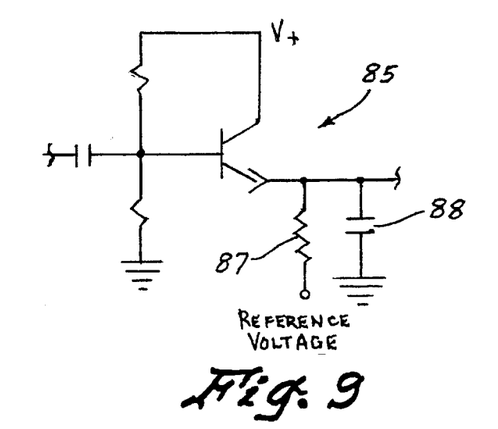
FIG. 9 is a schematic diagram of an envelope detector.

Referring to FIG. 9, an circuit diagram of an envelope detector (85) is shown. The resistor (87) and the capacitor (88) determine the time constant which controls the rate of decay of the peak. The resistor (87) and capacitor (88) for the envelope detector (85) are configured to give a relatively short time delay constant.

Referring again to FIG. 1, the outputs of the envelope detectors (18 & 19) are connected to a comparator (20). The comparator (20) compares the two outputs from the envelope detectors (18 & 19) and outputs a signal which is high when the signal from the envelope detector (18) is higher than the signal from the envelope detector (19). Similarly, the comparator (20) outputs a signal which is low when the output of the envelope detector (19) is higher than the envelope detector (18).

The use of a comparator (20) also helps to reduce the negative effect of noise and interference in the signal. Because a comparator tends to cancel out two opposing signals which are the same, and since the interference which is propagated through the first correlator (14), amp (16) and envelope detector (18) is the same as is propagated through the second correlator (15), amp (17) and envelope detector (19), the noise and interference in the signal tends to cancel itself out at the comparator.

Figure 7:
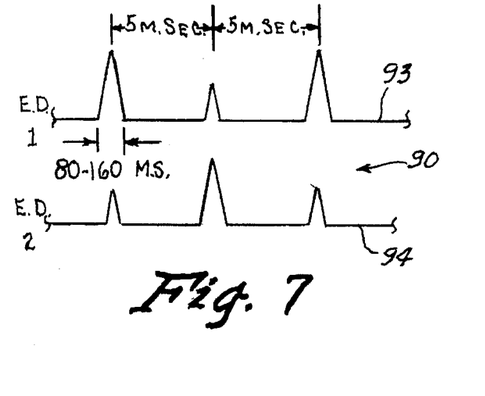
FIG. 7 is a diagrammatic illustration of sample outputs of the correlators of FIG. 1 after passing through an envelope detector.
Figure 8:
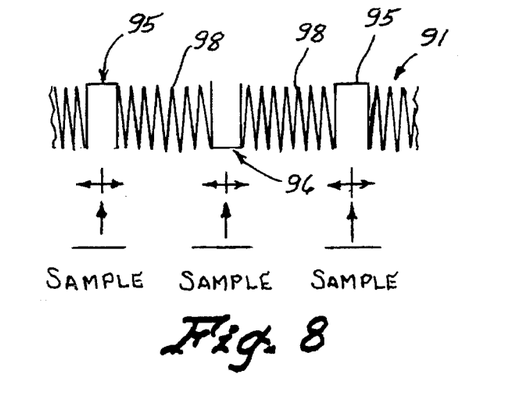
FIG. 8 is a diagrammatic illustration of the output of the comparator of FIG. 1 when the sample outputs of FIG. 7 are compared.

Referring to FIG. 7, the wave forms (90) of the envelope detectors (18 & 19) are shown. Referring to FIG. 8, the wave form (91) of the output of the comparator (20) is shown as it would look if the wave forms (90) of FIG. 7 were used as the inputs. As can be seen by comparing the wave forms, when the signal (93) from the first envelope detector (18) is higher than the signal (94) from the second envelope detector (19), there is a corresponding high signal (95) on the output (91) of the comparator (20). Similarly, a low signal (96) is seen on the output (91) of the comparator (20) when the signal (94) of the second envelope detector (19) is higher than the output signal (93) of the first envelope detector (18).

As is shown on FIG. 7, the length of each peak is approximately 80–160 nanoseconds. This is a short time when compared to the relatively long peak-to-peak time of 5 microseconds. When there is no peak on either signal (93) or signal (94), the signals are at approximately the same level. This causes the output of the comparator to oscillate between a high and low output. This oscillation (98) is shown on FIG. 8.

Figure 10:
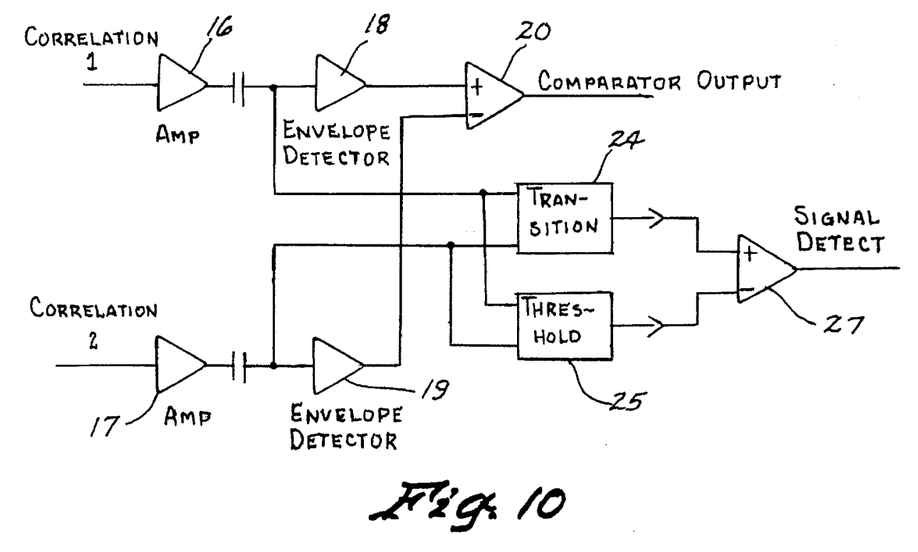
FIG. 10 is a schematic diagram of a receiver for decoding spread spectrum information built in accordance with the present invention.

Referring to FIGS. 1 and 10, the outputs of the correlators (14 & 15) after passing through the amps (16 & 17) are also connected to a transition detect circuit (24) and a threshold circuit (25). The outputs of the transition detect circuits (24) and the threshold circuit (25) are connected to a comparator (27) which operates as a signal detect.

Figure 11:
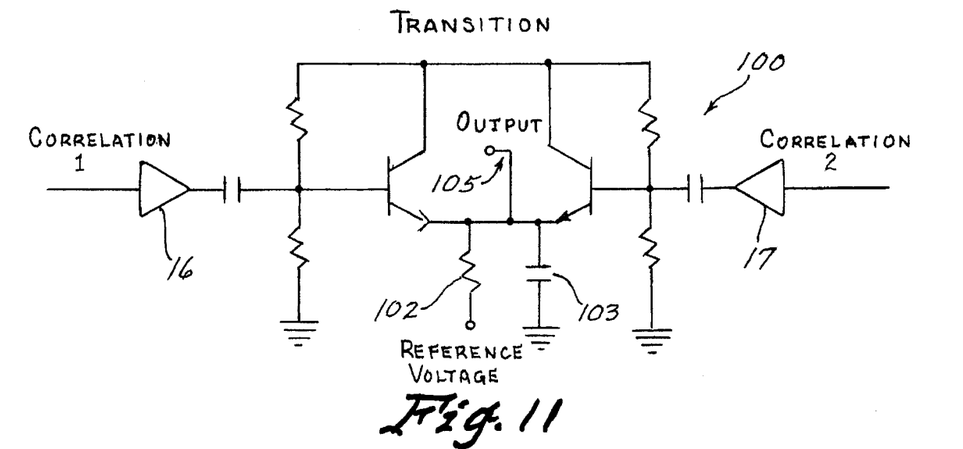
FIG. 11 is a circuit diagram of the transition detector.
Figure 12:
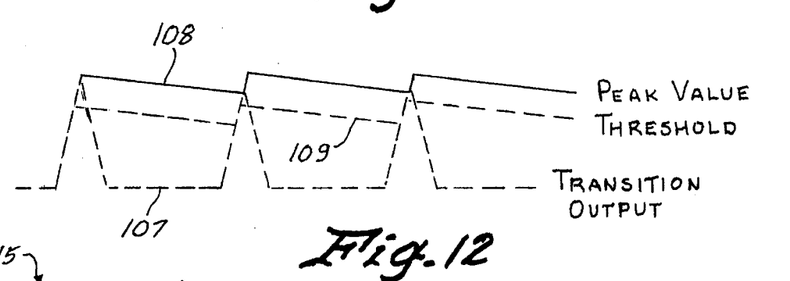
FIG. 12 is a diagrammatic illustration of the outputs of the threshold detector of FIG. 13.

Referring to FIG. 11, a transition detect circuit (100) is shown. The transition detect circuit (100) is essentially two envelope detectors placed back to back. The two envelope detectors operate independently and the output (105) of the transition detect circuit follows the peak of whichever signal is higher The resistor (102) and the capacitor (103) control the time delay constant which is configured to be similar to that of the envelope detectors (18 & 19). FIG. 12 shows a sample output (107) of the transition detect circuit (100) in dashed lines.

Figure 13:
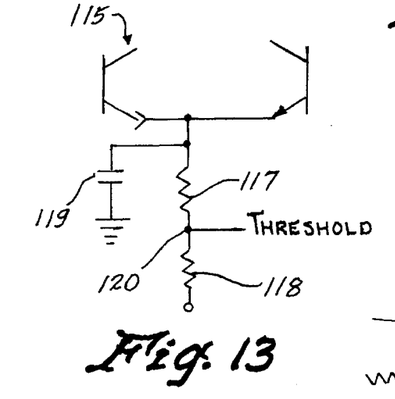
FIG. 13 is a partial schematic diagram of the threshold detector.

Referring to FIG. 13, a threshold circuit (115) is shown. The threshold circuit (115) is similar to the transition detect circuit (100) of FIG. 11. It also is essentially two envelope detectors placed back to back, except that the resistor and capacitor configuration is different. The resistor (102) from the transition detect circuit is replaced with two resistors (117 & 118). The threshold circuit output (120) is taken between the two resistors (117 & 118). Thus the resistors (117 & 118) operate as a voltage divider. The resistor values are chosen such that the output voltage (120) of the threshold circuit (115) is approximately 70% of the peak (undivided) voltage. The resistors (117 & 118) and the capacitor (119) are chosen such that the time delay of the threshold circuit is relatively long. The time delay is set such that it is equal to the time required for several transition peaks. FIG. 12 shows a sample wave form (109) for the output (120) of the threshold circuit (115) in dashed lines. Also shown is the peak value wave form (108) as it would be if not divided by the resistors (117 & 118).

Figure 15:
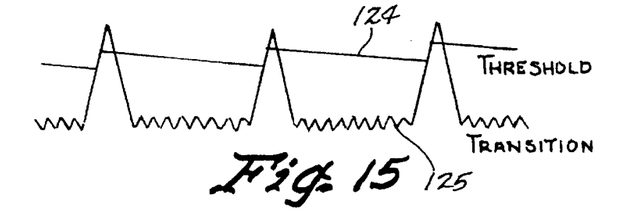
FIG. 15 is a diagrammatic illustration of the wave forms sent to the comparator of FIG. 14.

Referring now to FIG. 15, sample wave forms for the threshold output (124) and the transition output (125) are shown. As can be seen on the transition output (125), when the output is not peaking, the noise and interference will remain. However, the noise and interference will remain at a level lower than that of the threshold value (124) by virtue of the fact that the time delay for the threshold value is long so that the threshold value will remain relatively close to the peak value.

Figure 14:
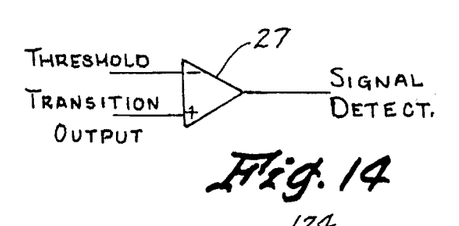
FIG. 14 is a comparator used to compare the outputs of the transition detector and the threshold detector.
Figure 16:
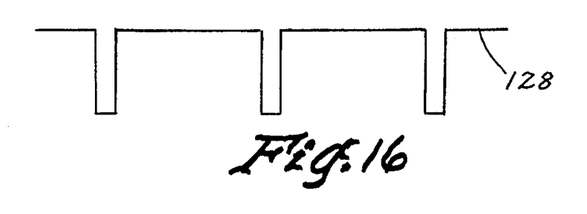
FIG. 16 is a diagrammatic illustration of the output of the comparator of FIG. 14.

Referring now to FIGS. 1, 10 and 14, the threshold circuit (25) output and the transition detect circuit (24) output are connected to a signal detect comparator (27). The signal detect comparator (27) outputs a high signal whenever the output of the threshold circuit (25) is higher than the output of the transition detect circuit (24). Similarly, the output of the signal detect comparator (27) is low when the output of the transition detect circuit (24) is higher than the output of the threshold circuit (25). FIG. 16 shows a sample signal detect comparator (27) output (128) when the signal detect comparator (27) compares the threshold and transition detect outputs shown in FIG. 15.

Referring again to FIG. 1, the output of the signal detect comparator (27) is connected to a phase-locked loop (30). The phase-locked loop oscillates at a frequency which corresponds to the transitions of the signal detect comparator (27) output. The phase-locked loop serves as a clock pulse to trigger a hold circuit (33) which samples and holds the output of the comparator (20). The decoded data read from the comparator (20) is outputted from the hold circuit (33) on line (37). The combination of the signal detect comparator (27) output and the phase-locked loop (30), insure that the output of the comparator (20) will be sampled at a time when the signal is valid and not at a time when the signal is oscillating.

A delay circuit (35) can be inserted between the phase-locked loop (30) and the hold circuit (33). The delay caused by the delay circuit (35) is very small and is used only as a fine tuning mechanism such that the optimum time to sample the output of the comparator (20) is chosen.

The phase-locked loop (30) can either be of the digital or analog type. The phase-locked loop allows for the spread spectrum processor to continue sampling at the most appropriate time, when the data is most likely to be correct, even if noise and interference temporarily make it difficult or impossible for the transition detect circuit (24), the threshold circuit (25) and the signal detect comparator (27) to give an accurate trigger. This is possible because the phase-locked loop (30) will continue to trigger the hold circuit (33) at the proper intervals. This is further possible because of the benefit derived from using a comparator (20) to compare the outputs of the envelope detectors (18 & 19). While the noise may affect the ability to get an accurate signal detect output, the comparator (20) will cancel the similar noise out of each channel, thus leaving the appropriate signal to be read. Thus, the phase-locked loop (30) makes it possible for the hold circuit (33) to sample the comparator (20) output even when the signal gets temporarily noisy.

Figure 17:
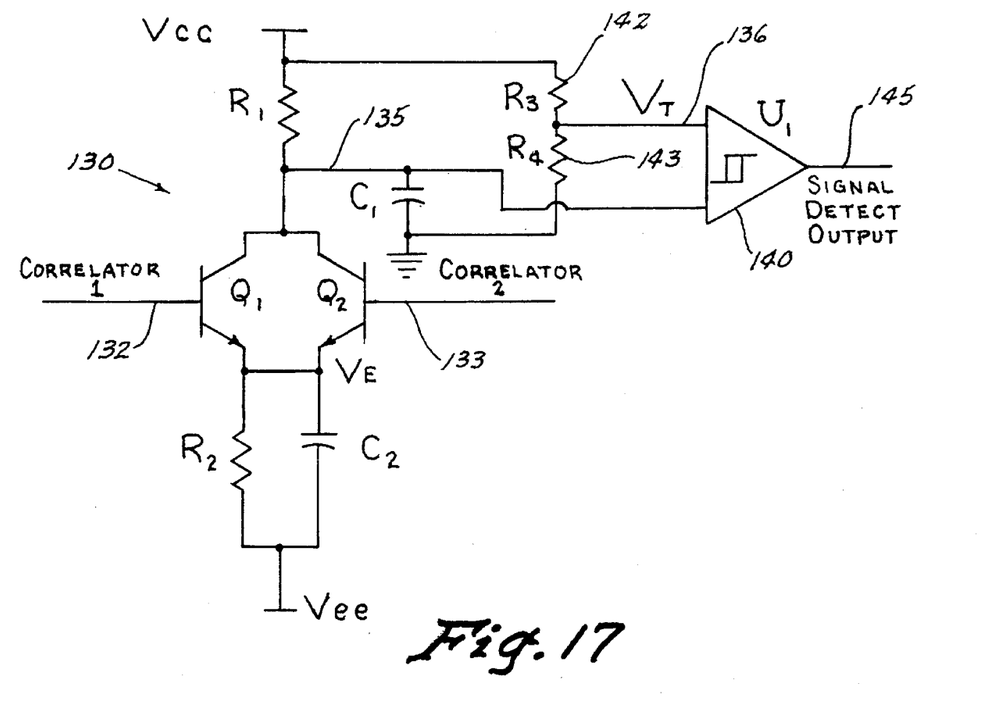
FIG. 17 is a circuit diagram of another embodiment of the transition and threshold detectors built in accordance with the present invention.

Referring now to FIG. 17, a circuit (130) of an alternative embodiment of the transition and threshold detectors built in accordance with the present invention is shown. The circuit (130) fundamentally accomplishes the same function as the transition detector (24), the threshold detector (25) and the signal detect (27) of FIG. 10. The output of the first correlator after passing through the amp (16) is connected to the circuit (130) at the transition input (132). The output of the second correlator after passing through the amp (17) is connected to the circuit (130) at the transistor input (133).

The output (135) of the transition portion of the circuit (130) is connected to a comparator (140). The output (136) of the threshold portion of the circuit (130) is also connected to the comparator (140). The threshold level in the circuit (130) shown in the current embodiment is a constant voltage and is determined by the voltage divider comprising of resistor (142) and resistor (143). The output (145) of the comparator (140) is utilized in the same fashion as the output of the signal detect (27) of FIG. 10.

In the present embodiment, fewer electrical components are necessary to accomplish the transition detect and the threshold detect. Also, the output of the transition portion of the circuit (130) is proportional to the rate of change of the signals which is a fixed property of the system determined by the selection of resistor and capacitor values for use in the circuit (130). Therefore, the output is not dependent upon the incoming signal levels and thereby creating a circuit which is tolerant of different input signal levels. Additionally, signal detection for systems requiring more than two correlator inputs can easily be accomplished by connecting the additional correlator input signals to additional transistors wherein the additional transistors are connected to the circuit (130) in a parallel configuration with respect to the two transistors already present.

Obviously, many modifications and variations of the present invention are possible in light of the above teachings. It is therefore to be understood that, within the scope of the appended claims, the invention may be practiced otherwise than as specifically described.

We claim:

1. Apparatus comprising:

antenna means for receiving an spread spectrum signal;

amplification means operably attached to said antenna means for amplifying said received signal;

first correlator means operably attached to said amplification means for determining the correlation level of said signal with respect to a first code sequence;

second correlator means operably attached to said amplification means for determining the correlation level of said signal with respect to a second code sequence;

comparing means for comparing the output levels of said first correlator means and said second correlator means;

holding means operably attached to said comparing means for sampling and holding the output of said comparing means; signal detection means operably attached to said first correlator means and said second correlator means for determining when a code sequence has been detected on one of the first and second correlator means;

triggering means for transferring a sample and hold trigger from said signal detector means to said holding means; and means for outputting the decoded information from said holding means.

2. A method of processing spread spectrum signals comprising of the steps of:

receiving a spread spectrum signal;

amplifying said spread spectrum signal;

correlating said signal using a first correlator having an output and a second correlator having an output;

comparing the outputs of said first correlator and said second correlator into a comparator output;

determining when a correlated signal has been detected on said first correlator or said second correlator;

determining the time interval between determinations that a correlated signal has been detected;

sampling the comparator output when a determination has been made that a correlated signal has been detected;

sampling the comparator output after the determined time interval even when a determination of a correlated signal detect has not been made; and holding the sampled comparator output until another sampling occurs.

3. The method of claim 2 including the step of outputting the held sampled comparator output,

* * * * *